Feb. 10, 1931.  C. A. DUNHAM  1,792,213

THERMOSTATICALLY CONTROLLED REDUCING VALVE

Filed Aug. 20, 1928   3 Sheets-Sheet 1

Fig. 1.

Inventor.
Clayton A. Dunham
By Barnett Truman
Attorneys.

Feb. 10, 1931. C. A. DUNHAM 1,792,213
THERMOSTATICALLY CONTROLLED REDUCING VALVE
Filed Aug. 20, 1928 3 Sheets-Sheet 2

Inventor
Clayton A. Dunham
By Barnett & Truman
Attorneys

Patented Feb. 10, 1931

1,792,213

UNITED STATES PATENT OFFICE

CLAYTON A. DUNHAM, OF GLENCOE, ILLINOIS, ASSIGNOR TO C. A. DUNHAM COMPANY, OF MARSHALLTOWN, IOWA, A CORPORATION OF IOWA

THERMOSTATICALLY-CONTROLLED REDUCING VALVE

Application filed August 20, 1928. Serial No. 300,737.

This invention relates to new and useful improvements in thermostatically controlled reducing valves, and more particularly to a valve of this type which not only automatically reduces steam from a higher to a lower pressure for use in a heating system, but also automatically cuts off the steam supply through the valve when a predetermined maximum temperature has been attained in the space that is being heated.

The pressure at which steam is supplied is often higher than the pressure at which it is desired for use, this being especially true in heating systems utilizing steam at a sub-atmospheric pressure. In such a system, it is necessary to use a reducing valve, or similar device, for lowering the pressure of the steam supplied to the pressure desired in the system. This valve permits a restricted or intermittent flow of steam into the system, the valve being automatically closed when the pressure at the low pressure side of the valve has attained the desired maximum, and again being automatically opened when the pressure at the low pressure side has fallen below a desired minimum. It is also desirable to add a temperature control feature so that variations in weather conditions may be automatically compensated for.

According to the present invention, the reducing valve is automatically controlled by a pressure chamber which is normally in communication with the low pressure side of the valve. A thermostatically controlled means is adapted to place this pressure chamber in communication with the high pressure side of the valve when a certain maximum temperature has been attained in the space being heated, and to again place the pressure chamber in communication with the low pressure side of the valve when the temperature has again fallen below this predetermined maximum.

The principal object of this invention is to provide a new and improved mechanism constructed and operating substantially as briefly described hereinabove, and as described more in detail in the disclosure which follows.

Another object is to provide a reducing valve in combination with a pair of similar control valves which are simultaneously and alternatively opened and closed to place the reducing valve under the control of either the high or low pressure sides of the system.

Another object is to provide a thermostatically controlled motor for automatically and alternatively operating the control valves in accordance with temperature changes.

Another object is to provide a reducing valve of this type which is electrically operated from a distance in accordance with temperature changes.

Another object is to provide a device of this character which is sensitive, and gives accurate pressure regulations at pressures below atmospheric.

Another object is to provide a valve of this type that is packless, that requires a minimum amount of balancing weights to set the valve for very low sub-atmospheric pressures, and that has a dashpot feature for dampening vibrations.

Other objects and advantages of the invention will be more apparent from the following detailed description of one approved form of the mechanism.

Figure 1:
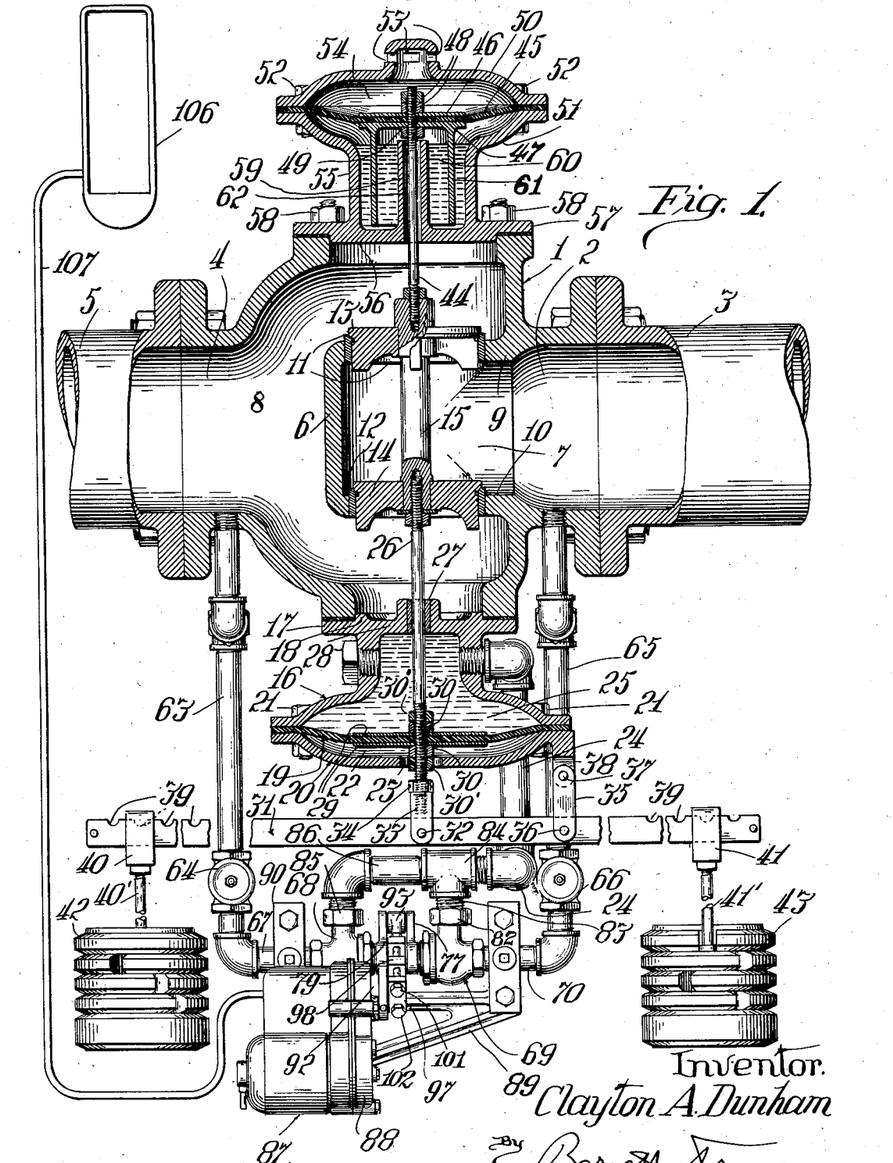
Fig. 1 is an elevation, partly in central vertical section, showing the improved reducing valve and the temperature-controlled operating mechanism therefor.

Referring first to Fig. 1, the reducing valve will first be described, this valve being substantially the same as the valve disclosed and claimed in my co-pending application, Serial No. 278,532, filed May 17, 1928.

The valve casing 1 is provided with an inlet port 2 communicating with a pipe 3 leading from the steam supply and with an outlet port 4 communicating with a pipe 5 which delivers the low pressure steam to the radiators or other apparatus. An internal web 6 divides the casing 1 into a high pressure chamber 7 and a low pressure chamber 8, the web 6 comprising parallel horizontal portions 9 and 10 provided with aligned vertical valve openings, in which are positioned the valve seats 11 and 12. The semi-balanced valves 13 and 14, connected to operate in unison by the stem 15, are adapted to engage respectively the valve seats 11 and 12 to cut off communication between the high pressure chamber 7 and the low pressure chamber 8. When these valves are raised from their seats, by the mechanism hereinafter described, steam will flow from the high pressure source through the valve openings into the low pressure chamber 8 so as to increase the quantity of steam therein and consequently elevate the low pressure. When this low pressure has been raised to the desired maximum, the valves 13 and 14 will be automatically moved against their seats so as to prevent the further passage of steam into low pressure chamber 8, and the subsequent usage or condensation of the steam at the low pressure side of the valve will lower this pressure until a desired minimum has been reached, at which time the valves 13 and 14 will again be raised to admit more steam into chamber 8.

The upper portion 16 of a diaphragm casing has an outwardly projecting flange 17 secured to the bottom of casing 1, and an upwardly extending annular flange 18 adapted to properly center the casing within the opening in the bottom of casing 1. A circular flexible metallic or composition diaphragm 19 is clamped at its outer edge between the dished lower portion of casing 16 and the lower diaphragm casing member 20. These dished casing members 16 and 20 are secured together about the diaphragm 19 by a plurality of bolts 21. The chamber 22 at the lower side of diaphragm 19 is in communication with the outer atmosphere through central opening 23. A conduit or pipe 24 leads from the pressure chamber 25 above diaphragm 19 to the motor-operated control valves hereinafter described. The pipe 24 and chamber 25 above diaphragm 19 will become filled with liquid condensate, so as to form a water seal, preventing the direct contact of steam with the diaphragm 19.

A valve stem 26 is secured at its upper end to the valve assembly 13, 14 and 15, projects downwardly through the slide bearing 27 in the web 28 which separates chamber 8 of casing 1 from chamber 25 of the diaphragm casing, and projects through a central opening in diaphragm 19 and then through opening 23 in the bottom of the diaphragm casing 20. The stem 26 is sealed to diaphragm 19 so as to move therewith and so as to prevent the passage of fluids through the diaphragm, by means of diaphragm plates 29, held in place by positioning nuts 30 and lock nuts 30' threaded upon the lower portion of valve stem 26.

It will hereinafter be noted that the low pressure in pressure chamber 25 will normally be substantially the same as the pressure in low pressure valve chamber 8 so that no stuffing box is required at 27, and this bearing serves principally as a guide for the stem and need not be sufficiently tight to impede the vertical movement of the valve stem.

A lever 31 is intermediately pivoted at 32 in a yoke member 33 screwed on the lower end of valve stem 26 and held in place by lock-nut 34. A fulcrum link 35 is pivoted at its lower end 36 to lever 31, and is pivotally hung at 37 from bracket 38 formed on diaphragm casing 20. The two arms of lever 31 are notched at 39 to hold the supporting yokes 40 and 41, which carry the adjustable weights 42 and 43 respectively. It will be apparent that by varying the amount of weights 42 and 43, and by varying their distances from the fulcrum point 36 by adjusting the yokes 40 and 41 in notches 39, the vertical pressure exerted on the lower end of valve stem 26 may be varied, as desired. The use of the fulcrum link 35 avoids all lost motion between lever 31 and valve stem 26, and reduces to a minimum the side thrusts on the valve stem. The arms 40' and 41' of the yokes 40 and 41 may be made as long as desired, so that the adjustable weights 42 and 43 will be accessible even though the reducing valve is positioned at a rather high elevation.

A second valve stem 44, which is practically an upward extension of the lower valve stem 26, is secured at its lower end to the valve assembly 13, 14, and 15, and its upper threaded end passes through a central opening in a second flexible diaphragm 45. Valve stem 44 is secured to diaphragm 45 by the upper diaphragm plate 46 and lower inverted cup 47, these parts being clamped against the diaphragm by the nuts 48 and 49 screwed on the valve stem 44. The circular flexible metallic or composition diaphragm 45, which is of less area than the lower diaphragm 19, is clamped at its outer edges between the opposed dished casing members 50 and 51, secured together by bolts 52. The upper casing member 50 is provided with apertures 53, through which air at atmospheric pressure is admitted to the chamber 54 above diaphragm 45. The lower member 51 of the diaphragm casing has a downwardly extending cylindrical portion 55 and an inwardly extending bottom portion 56 mounted in an opening in the top of valve casing 1, and secured thereto by means of the outwardly extending flange 57 and bolts 58. A central upwardly extending tubular portion 59 completes an annular well 60 formed in the lower casing member 51. The sides 61 of the inverted cup 47 project downwardly into annular well 60. The valve stem 44 projects upwardly through the tubular portion 59, and an annular steam passage or conduit 62 between stem 44 and tubular member 59 permits steam at the low pressure existing in chamber 8 to flow into the inverted cup 47. The annular well 60 will be maintained filled with liquid condensate, by condensation of steam. The body of liquid in well 60 is sufficiently large so that it is never entirely displaced by the vertical movements of the inverted cup, so that there will always be a liquid seal which will prevent the steam within the cup from coming in contact with the diaphragm 45. However, the entire movable lower surface of diaphragm 45 will be subjected to a pressure equal to that of the steam at the low pressure side of the valve. Aside from serving as a liquid seal, the movements of the inverted cup within the liquid confined in the annular well have a dash-pot effect, tending to dampen any vibrations that might result from rapid pressure fluctuations, due to the flow of steam through the valves.

Under normal conditions, steam at the low pressure existing in the low pressure side of the system will be admitted to pressure chamber 25 above the larger diaphragm 19, and steam at this pressure is always admitted to the chamber beneath upper diaphragm 45. It will thus be seen that each of the diaphragms 19 and 45 is subject to a force equal to the difference in pressure between atmosphere and the pressure existing in the low pressure side of the system, multiplied by the exposed area of the respective diaphragm. It will be noted that these forces will always be opposed to one another, but the effective area of the lower diaphragm 19 is greater than the effective area of the upper diaphragm 45 so that a force equal to the difference between these opposed forces will be available to move the valves 13 and 14 toward or from their seats. This latter force is opposed by the adjustable weights 42 or 43 so as to secure the desired pressure at the low pressure side of the valve.

If there is a preponderance of weight applied to the left-hand arm of lever 31, there will be a constant downward force exerted on the valve stems tending to hold the valves 13 and 14 upon their seats 11 and 12. In order to overcome this force and open the valves, the pressure differential applied to the diaphragm 19 must exert an upward pressure on the valve stem 26. It will be apparent that in order to secure this pressure differential the pressure in the upper chamber 25 will have to be below atmospheric. As the preponderance of weight on the left-hand arm of lever 31 is increased, the pressure in chamber 25 will have to be lowered (or the vacuum increased) in order that the pressure differential applied to diaphragm 19 will be sufficient to overcome the opposed pressure differential on diaphragm 45 and also to lift the weights. The valves 13 and 14 will therefore remain closed until this vacuum is attained in the low pressure side of the system, whereupon the valves 13 and 14 will be opened to admit more steam into low pressure chamber 8. As soon as the sub-atmospheric pressure has been raised above the vacuum for which the valve is set, the pressure differential exerted on diaphragm 19 will be no longer sufficient to hold up the weights, and the valves 13 and 14 will be automatically closed.

It will be apparent that if a preponderance of weight is applied to the right-hand arm of lever 31, this will result in a constant upward pressure on the valve stems tending to open the valves 13 and 14. In order to counteract this pressure and close the valves, the pressure in chamber 25 (and hence in the low pressure side of the system) must be greater than atmospheric. In this way the valve may be used to maintain super-atmospheric pressures at the low pressure side of the valve, these pressures, however, being lower than the pressure existing in the supply pipe 3.

It will be noted that in every case, the action of the upper diaphragm 45 is opposed to the action of the lower diaphragm 19, thereby reducing the amount of constant pressure that must be applied by means of the adjustable weights 42 and 43. The steam does not come in direct contact with either of the diaphragms, and there is no necessity for any stuffing boxes about either of the valve stems. This greatly reduces the friction of the moving parts, and the valves also have a better floating action since they are suspended between two movable diaphragms.

The reducing valve as hereinabove described will, when properly adjusted, maintain steam in the radiators at a desired subatmospheric pressure, and consequently low temperature so as to maintain a desired substantially constant low heat output to replace heat losses in the space the temperature of which is being regulated. However, since outside weather conditions are not constant, it is desirable to add means for automatically cutting off or throttling down the steam supply when sudden or intermittent rises in temperature make a decrease in the heat output desirable. The thermostatically controlled regulating mechanism hereinafter described has been added for this purpose.

Figure 2:
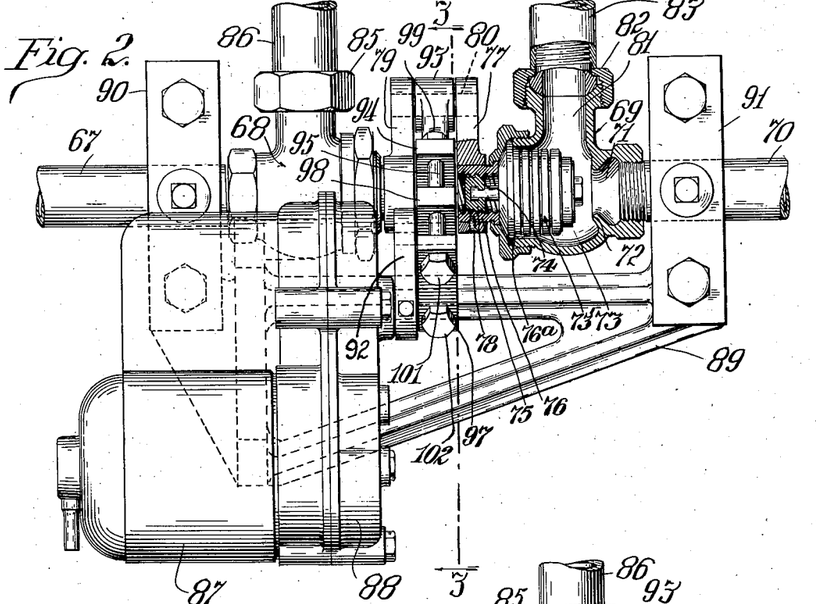
Fig. 2 is an elevation on a larger scale, partly in section, of the motor-operated control valves.
Figure 3:
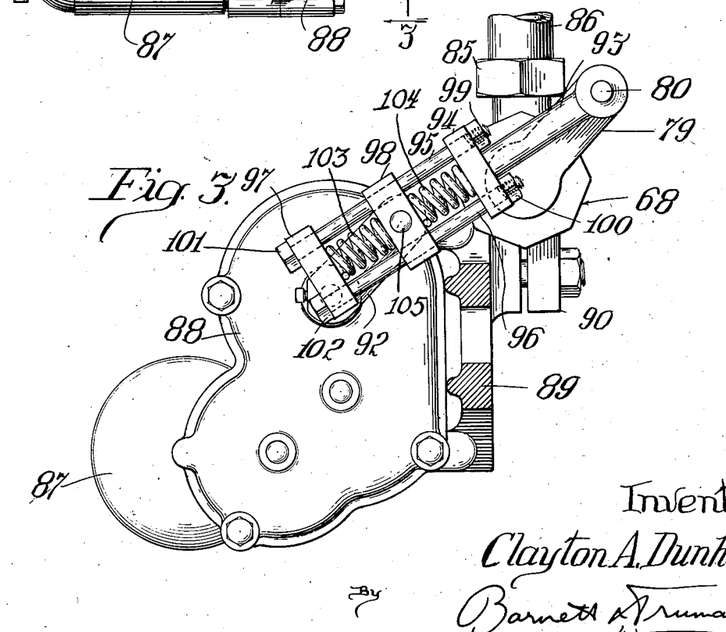
Fig. 3 is a transverse vertical section taken substantially on the line 3—3 of Fig. 2.

A pipe 63 provided with a normally open gate valve 64 extends downwardly from the low pressure chamber 8 of valve casing 1, and a similar pipe 65 provided with gate valve 66 extends downwardly from the high pressure chamber 7. A right-angled extension 67 of pipe 63 connects with and supports a control or cut-off valve 68, and a similar valve 69 is connected with and supported by extension 70 of pipe 65. The two valves 68 and 69 are exactly similar, but positioned end to end in reversed position, as best shown in Fig. 2, wherein valve 69 is shown in central section. This valve 69 is of the packless type, and comprises an inlet port 71 in which is screwed the end of the supporting pipe 70. Valve seat 72 is formed at the inner end of port 71, and the movable valve member 73 is adapted to be forced against the seat 72 to cut off the flow of steam through the valve. The valve 73 is moved by means of stem 74 which is swiveled in the valve member at one end and attached at the other end to screw 75 threaded within hollow sleeve or nut 76 which is rotatably mounted in the upper end or cover of the valve casing. Rotation of stem 74 and screw 75 is prevented by the plate 76ᵃ in which the stem has a non-rotatable sliding fit. A crank arm 77 secured to sleeve 76 at 78 serves to rotate the sleeve and thus move the valve member 73 toward or from valve seat 72. The parts are so proportioned that a rotation of crank 77 through somewhat less than 180° is sufficient to move the valve 73 into or out of valve-closing position.

A hollow diaphragm 73' is anchored at its outer edge to the valve casing, and at its inner edge to the movable valve member 73 thus forming a permanent closure between valve 73 and the casing in all positions of the valve and avoiding the necessity for any packing about the movable valve operating mechanism which projects through the valve casing.

The crank arm 79 of the similar valve 68 is connected with the opposed crank arm 77 by crank pin 80, so that the two cranks will rotate in unison. Since the two valves are positioned end to end, that is one is inverted with respect to the other, when the two cranks 77 and 79 are rotated in unison through approximately 180°, one of the valves will be closed and the other valve opened. When this rotation, or oscillation, is reversed the first valve will be opened and the second valve closed. In other words when one of the valves is closed the other is opened, and vice versa. The outlet port 81 of valve 69 is connected by coupling 82 with pipe 83 leading to the union 84. The outlet port of valve 68 is similarly connected by coupling 85 and pipe 86 with the union 84. The lower end of pipe 24 which connects with pressure chamber 25 above diaphragm 19, also connects with the union 84.

Under normal conditions, valve 69 will be closed and valve 68 open at which time pressure chamber 25 will be in communication with the low pressure side of the system through pipes 63 and 67, valve 68, pipe 86, union 84 and pipe 24. However, if valve 68 is closed and valve 69 opened, the pressure chamber 25 will be in communication with the high pressure side of the system through pipes 65 and 70, valve 69, pipe 83, union 84, and pipe 24.

A small electric motor 87, and a suitable train of reducing gearing housed in casing 88, are carried by a bracket 89 supported by clamps 90 and 91 from the horizontal pipes 67 and 70. An operating crank arm 92 is driven from motor 87 through the reduction gearing. Operating crank 92 is connected with the valve cranks 77 and 79 by a yielding link mechanism comprising a connecting rod 93 which is pivoted at one end on crank pin 80 and secured at its other end to the block 94 which is perforated to slidably receive the two similar slide rods 95 and 96. Two other blocks 97 and 98 are similarly perforated to slide on the rods 95 and 96. A pair of nuts 99 and 100 at one end of the rods 95 and 96 prevent movement of block 94 from this end of the rods, and a similar pair of nuts 101 and 102 prevent movement of block 97 from the other end of the rods. The slide-block 98 is held in floating position midway between the blocks 94 and 97 by means of the compression springs 103 and 104 confined between the blocks 97 and 98, and the blocks 98 and 94 respectively. The crank pin 105 at the outer end of operating crank arm 92 is pivoted within the slide-block 98.

It is to be understood that the operating crank 92 is rotated intermittently, always in the same direction, through successive arcs of approximately 180° each. The valve cranks 79 and 77 are oscillated back and forth through an arc of somewhat less than 180°. The half rotation of operating crank 92 will serve to swing the valve cranks from one limit of their movement to the other, thus opening one valve and closing the other. When one of the valves has been completely closed, any further rotation of operating crank 92 will be expended in compressing one of the springs 103 or 104. On the next succeeding rotation of operating crank 92, after the crank has moved past the dead center, the compressed spring will expand and the valve cranks will then be swung to the other limit of their movement where a similar compression of the other spring takes place after the other valve has been closed. As is well known, the amount of movement necessary to open or close a valve will vary somewhat, but the mechanism just described provides means for yieldably forcing either valve to its seat, regardless of the exact amount of oscillation of the operating cranks, and this is accomplished by means of an intermittently rotating motor and crank arm.

Figure 4:
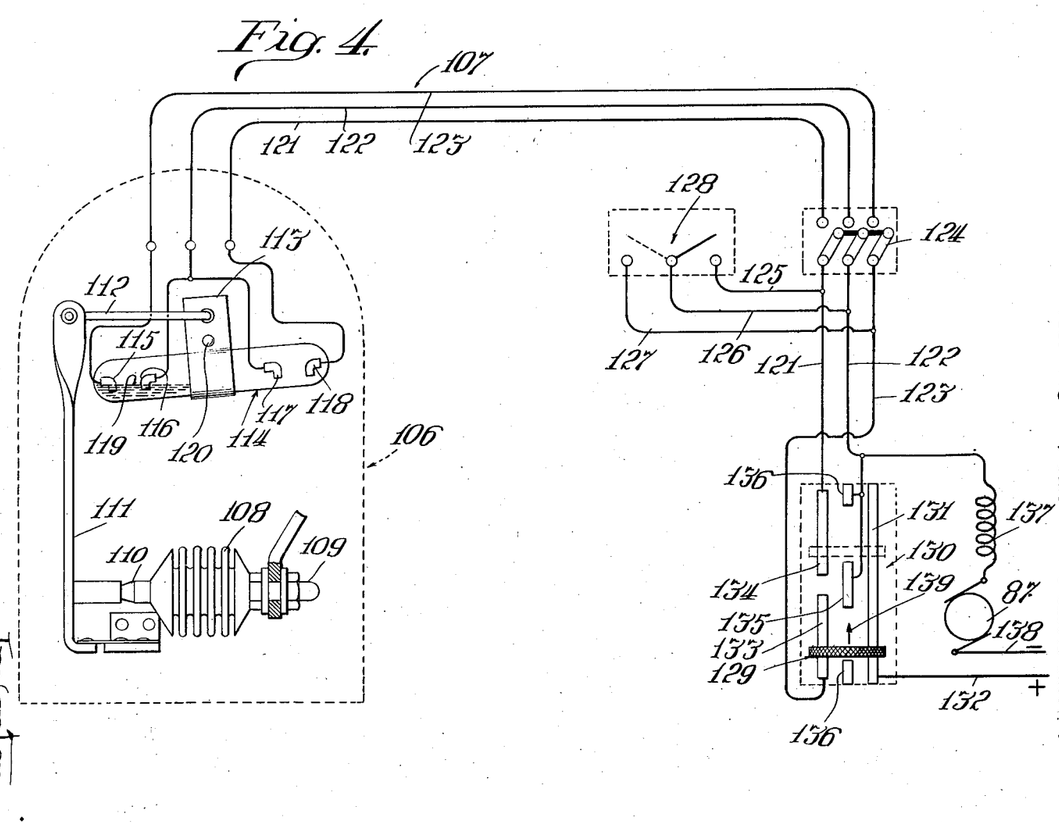
Fig. 4 is a wiring diagram, and a diagrammatic representation of the thermostatically operated switch, and the stop mechanism for the motor.

The operation of motor 87 is controlled automatically by a thermostat which is indicated diagrammatically at 106 in Fig. 1, and is connected with motor 87 by a three-wire cable indicated at 107. The operation of motor 87 and thermostat 106 are best shown by the wiring diagram of Fig. 4. The thermostat comprises a sealed corrugated bellows 108 containing a fluid which expands and contracts with temperature changes. One end of the bellows is adjustably anchored at 109, and the other end 110 bears against an intermediate portion of the spring arm 111, the free end of which is connected through link 112 with one arm of the pivoted frame 113 which carries the closed tube 114 of a mercury switch. One end of tube 114 houses a pair of spaced contacts 115 and 116, and the other end contains a similar pair of contacts 117 and 118, either pair of contacts being closed by the body of mercury 119 contained within the tube when the tube is tilted from one position to another about the pivot 120 of supporting frame 113. As shown in Fig. 4, the circuit is completed through contacts 115, 116 and mercury globule 119, whereas the circuit between 117 and 118 is broken.

The three-wire cable 107 hereinabove referred to, contains the three wires 121, 122 and 123. Wire 121 is connected to end contact 118 of the mercury switch, and wire 123 is connected to the other end contact 115. The intermediate wire 122 is connected to the two intermediate contacts 116 and 117. A three-pole single throw switch 124 is interposed in cable 107 and adapted to break all of the circuits leading from the thermostat 106 in case the automatic operation of the motor is to be discontinued and the motor operated manually. For this latter purpose, branch wires 125, 126 and 127 lead respectively from the wires 121, 122 and 123 to a single-pole double throw switch 128 by means of which a circuit may be manually completed either through wires 125 and 126 or wires 126 and 127.

A stop switch mechanism is provided for halting the rotation of motor 87 after it has rotated sufficiently to swing the operating crank 92 through an angle of 180°. This stop mechanism comprises a movable contact 129 which is revolved through an orbit as the motor 87 rotates, and a circular series of fixed contacts shown developed at 130, over which the movable contact 129 travels. These fixed contacts comprise a continuous annular contact ring 131 which is connected with the positive power line 132. A pair of aligned arcuate contacts 133 and 134, slightly spaced apart at their ends, are connected respectively with the wire leads 123 and 121. Positioned at one side of the gaps between contacts 133 and 134, are a pair of short contacts 135 and 136, both connected with the intermediate wire 122. Wire 122 is also connected with the field 137 of motor 87, the other side of the motor being connected with the negative power main 138.

With the parts in the positions shown in Fig. 4 (but assuming that single throw switch 124 is closed and manually operated switch 128 is open so that the mechanism is set for automatic operation), thermostat 108 has just expanded due to a temperature higher than the desired maximum so as to swing the arm 111 and tilt the mercury switch to the position shown so that a circuit is completed through contacts 115 and 116. This circuit is as follows: positive main 132, stationary contact ring 131, movable contact 129, arcuate stationary contact 133, wire 123, fixed contact 115, mercury 119, fixed contact 116, wire 122, and the field and armature of motor 87 to the negative main 138. The motor 87 now being energized will rotate, thus moving the contact 129 in the direction of the arrow 139. The circuit just described will remain closed until contact 129 passes off from the end of arcuate contact 133, but at this time the movable contact 129 will be in engagement with the short contact 135 so that the motor will remain energized since contact 135 is directly connected with wire 122 leading to the motor. However, when movable contact 129 reaches the position shown in dotted lines and has passed over the end of contact 135, this latter circuit will be broken and the motor will be deenergized and will stop. The distance traveled by movable contact 129 from the solid line position to the dotted line position corresponds to a movement of 180° of operating crank 92. The motor will remain stationary until the temperature has fallen below the maximum for which thermostat 108 is set, whereupon the contraction of the thermostat will tilt tube 114 in the other direction so as to break the circuit through contacts 115 and 116 and complete a circuit through contacts 117 and 118. This latter circuit is exactly similar to the one first described except that it passes through the arcuate contact 134 and wire 121, and contacts 117 and 118 of the mercury switch. The motor will now be again energized to rotate in the same direction as before. When this last described circuit is broken, a shorter circuit through the motor will be completed through the short contact 136, but this latter motor circuit will be broken when the movable contact 129 again reaches the initial position shown in full lines in Fig. 4. The motor has now rotated sufficiently to move operating crank 92 through another angle of 180°, that is back to its original position. It will be observed that each time the mercury switch 114 is tilted, the motor operating circuit is completed and the motor will be automatically stopped after it has moved the operating crank 92 through 180°.

It will be apparent that these operations of motor 87 may be manually caused at any time by closing the switch 128 in the proper direction. If it is desired to entirely disconnect the thermostatic mechanism, the switch 124 will be opened.

In the general operation of the reducing valve, the weights 42 and 43 will be so adjusted that steam at a suitable sub-atmospheric pressure will be maintained in the low pressure side of the system, the heat given out by this low pressure steam being approximately sufficient to maintain the desired temperature in the space being heated. So long as a certain maximum temperature for which the thermostat is adjusted is not exceeded, the low pressure side of the system will remain in communication with pressure chamber 25 above diaphragm 19, and the reducing valve will operate intermittently, exactly as described in my previous copending application hereinbefore referred to, and the same as if the thermostatic mechanism were not present. However, if for any reason the maximum temperature is exceeded, thermostat 106 will cause the motor 87 to operate, as already described, thus closing valve 68 and opening valve 69 so as to place the high pressure side of the system in communication with pressure chamber 25. This higher pressure will immediately close the valves 13 and 14, and hold them closed regardless of the pressure in the low pressure side of the system, until the temperature has again fallen below the maximum for which the thermostatic apparatus is set, whereupon the thermostat will again cause an operation of motor 87 to close valve 69 and open valve 68, thus returning the reducing valve to its normal operation in response to the pressure of the steam in the low pressure side of the system.

It will be noted that all of the operating valves and moving parts are packless, and that effective water seals prevent contact of steam with the flexible diaphragms 19 and 45, and the valve diaphragms 73' so that not only will the escape of steam be prevented, but the temperatures to which these flexible parts are subjected will be greatly reduced thus lengthening the life of the apparatus. These water seals also effectively prevent the entrance of air into the heating system, which will ordinarily be operating under sub-atmospheric pressures.

It will be noted that the dash-pot effect obtained under the upper diaphragm, will dampen any vibrations that may be set up as a result of the disturbance of the flow condition in respect to the opening or closing of the valves 13 and 14. The tendency of opening valve 69 and closing valve 68 will always be to cause the valves 13 and 14 to close, because the effective vacuum operative on diaphragm 19 will be reduced. Should it happen that the pressure on the supply side of the system is at a very low value, as the result of the rate at which the system is taking steam, the admission of this pressure to the pressure chamber 25 would eventually result in closing the valve because the reduction in the rate of steam flow would naturally cause an increase in the supply pressure. This will give a more or less gradual closing action to the valves, which is advantageous.

I claim:

1. In combination, a reducing valve comprising a casing divided into high and low pressure chambers, a valve controlling communication between the chambers, pressure operated means for moving the valve, and thermostatically controlled valve conduits for alternatively connecting the pressure operated means with either the high or low pressure sides of the reducing valve.

2. In combination, a reducing valve comprising a casing divided into high and low pressure chambers, a valve controlling communication between the chambers, a valve stem attached to the valve and projecting from the casing, a pressure chamber, a flexible diaphragm forming one wall of the pressure chamber, the valve stem being connected with the diaphragm, means for exerting a constant but adjustable pressure on the valve stem in one direction, and thermostatically controlled valve connections whereby the pressure chamber which is normally in communication with the low pressure side of the reducing valve, is connected with the high pressure side of the valve when a given temperature is exceeded in the space wherein the temperature is being controlled.

3. In combination, a reducing valve comprising a casing divided into high and low pressure chambers, a valve controlling communication between the chambers, a valve stem attached to the valve and projecting from the casing, a pressure chamber, a flexible diaphragm forming one wall of the pressure chamber, the valve stem being connected with the diaphragm, means for exerting a constant but adjustable pressure on the valve stem in one direction, and thermostatically controlled means for determining the pressure applied in the pressure chamber.

4. In combination, a reducing valve comprising a valve casing divided into high and low pressure chambers, a valve controlling communication between the chambers, a valve stem projecting from the valve outside of the casing, a pressure chamber, a flexible diaphragm forming one wall of this pressure chamber, the valve stem being connected with the diaphragm, means for exerting a constant but adjustable pressure in one direction on the valve stem, valved pipe connections between the pressure chamber and both the high and low pressure sides of the valve, and thermostatically controlled means for operating the valved connections in accordance with temperature changes to alternatively place the pressure chamber in communication with either the high or low pressure side of the reducing valve.

5. In combination, a reducing valve comprising a valve casing divided into high and low pressure chambers, a valve controlling communication between the chambers, a valve stem projecting from the valve outside of the casing, a pressure chamber, a flexible diaphragm forming one wall of this pressure chamber, the valve stem being connected with the diaphragm, means for exerting a constant but adjustable pressure in one direction on the valve stem, pipe connections between the pressure chamber and both the high and low pressure sides of the reducing valve, a cutoff valve in each of these pipe connections, a motor means for simultaneously operating these latter valves so that one is closed when the other is open, and temperature-controlled means for operating the motor.

6. In combination, a reducing valve comprising a valve casing divided into high and low pressure chambers, a valve controlling communication between the chambers, a valve stem projecting from the valve outside of the casing, a pressure chamber, a flexible diaphragm forming one wall of this pressure chamber, the valve stem being connected with the diaphragm, means for exerting a constant but adjustable pressure in one direction on the valve stem, pipe connections between the pressure chamber and both the high and low pressure sides of the reducing valve, a cutoff valve in each of these pipe connections, a motor means for simultaneously operating these latter valves so that one is closed when the other is open, and motor controlling means comprising a thermostatically operated switch.

7. In combination, a reducing valve comprising a valve casing divided into high and low pressure chambers, a valve controlling communication between the chambers, a valve stem projecting from the valve outside of the casing, a pressure chamber, a flexible diaphragm forming one wall of this pressure chamber, the valve stem being connected with the diaphragm, means for exerting a constant but adjustable pressure in one direction on the valve stem, a pair of similar control valves, pipe connections between the outlets of each of these valves and the pressure chamber, a pipe connecting the inlet of one valve with the high pressure side of the reducing valve, a pipe connecting the inlet of the other valve with the low pressure side of the reducing valve, a motor, connections whereby a predetermined rotation of the motor will open one control valve and close the other, or vice versa, and temperature controlled means for operating the motor.

8. In combination, a reducing valve comprising a valve casing divided into high and low pressure chambers, a valve controlling communication between the chambers, a valve stem projecting from the valve outside of the casing, a pressure chamber, a flexible diaphragm forming one wall of this pressure chamber, the valve stem being connected with the diaphragm, means for exerting a constant but adjustable pressure in one direction on the valve stem, a pair of similar control valves, pipe connections between the outlets of each of these valves and the pressure chamber, a pipe connecting the inlet of one valve with the high pressure side of the reducing valve, a pipe connecting the inlet of the other valve with the low pressure side of the reducing valve, a motor, connections whereby a predetermined rotation of the motor will open one control valve and close the other, or vice versa, a stop mechanism for disconnecting the power from the motor after each valve-operating rotation thereof, and a thermostatically operated switch for applying power to the motor.

9. In combination, a reducing valve comprising a valve casing divided into high and low pressure chambers, a valve controlling communication between the chambers, a valve stem projecting from the valve outside of the casing, a pressure chamber, a flexible diaphragm forming one wall of this pressure chamber, the valve stem being connected with the diaphragm, means for exerting a constant but adjustable pressure in one direction on the valve stem, a pair of similar control valves, pipe connections between the outlets of each of these valves and the pressure chamber, a pipe connecting the inlet of one valve with the high pressure side of the reducing valve, a pipe connecting the inlet of the other valve with the low pressure side of the reducing valve, a motor, connections whereby a predetermined rotation of the motor will open one control valve and close the other, or vice versa, stop mechanism for disconnecting the power from the motor after each valve-operating rotation thereof, a switch adapted to connect the power with the motor when either a predetermined maximum or minimum temperature is established, and a thermostat for operating the switch.

10. In combination, a reducing valve comprising a casing divided into high and low pressure chambers, a valve controlling communication between the chambers, pressure operated means for moving the valve and a cut-off valve for controlling the flow of pressure fluid to the pressure operated means comprising a crank which is oscillated through an angle of less than 180° in moving the valve from open to closed position or vice versa, an operating crank, power means for intermittently rotating this latter crank in one direction through successive steps of 180° each, and a yieldable link operatively connecting the two cranks.

11. In combination, a reducing valve comprising a casing divided into high and low pressure chambers, a valve controlling communication between the chambers, pressure operated means for moving the valve and a cutoff valve for controlling the flow of pressure fluid to the pressure operated means comprising a crank which is oscillated through an angle of less than 180° in moving the valve from open to closed position or vice versa, an operating crank, power means for intermittently rotating this latter crank in one direction through successive steps of 180° each, and a link operatively connecting the two cranks, said link comprising springs arranged so that the effective length of the link may be varied.

12. In combination, a cutoff valve comprising a crank which is oscillated through an angle of less than 180° in moving the valve from open to closed position or vice versa, an operating crank, a link operatively connecting the two cranks and comprising springs arranged so that the effective length of the link may be varied, a motor geared to the operating crank, a thermostatically operated switch adapted to close the motor actuating circuit whenever the temperature rises above or falls below a predetermined temperature, and a stop switch mechanism for breaking the motor circuit after the operating crank has been rotated through an angle of 180°.

13. In combination, a reducing valve comprising a valve casing divided into high and low pressure chambers, a valve controlling communication between the chambers, a valve stem attached to the valve and projecting from the casing, a pair of diaphragms one of greater area than the other and both attached to the valve stem, means for exerting a constant but adjustable pressure in one direction on the valve stem, a pair of pressure chambers, the opposed sides of the two diaphragms each forming one wall of one of the chambers, the other side of each diaphragm being exposed to atmospheric pressure, a conduit connecting the pressure chamber associated with the smaller diaphragm with the low pressure side of the reducing valve, a pair of cutoff valves, one having its inlet connected with the high pressure side and the other having its inlet connected with the low pressure side of the reducing valve, pipe connections between the outlets of the two cutoff valves and the pressure chamber associated with the larger diaphragm, a motor, gear conections whereby a predetermined rotation of the motor in one direction will open one cutoff valve and close the other, a subsequent predetermined rotation of the motor serving to close the first valve and reopen the second valve, a stop switch mechanism for cutting off the power to the motor after each predetermined valve-operating rotation thereof, a switch adapted when moved in either direction to connect the power with the motor, and a thermostat connected to move the latter switch in response to temperature changes.

14. In combination, a reducing valve comprising a valve casing divided into high and low pressure chambers, a valve controlling communication between the chambers, a valve stem attached to the valve and projecting from the casing, a pair of diaphragms one of greater area than the other and both attached to the valve stem, means for exerting a constant but adjustable pressure in one direction on the valve stem, a pair of pressure chambers, the opposed sides of the two diaphragms each forming one wall of one of the chambers, the other side of each diaphragm being exposed to atmospheric pressure, a conduit connecting the pressure chamber associated with the smaller diaphragm with the low pressure side of the reducing valve, a pair of cutoff valves, one having its inlet connected with the high pressure side and the other having its inlet connected with the low pressure side of the reducing valve, pipe connections between the outlets of the two cutoff valves and the pressure chamber associated with the larger diaphragm, and thermostatically controlled means for alternatively opening one cutoff valve and closing the other in response to temperature changes.

15. In combination, a reducing valve comprising a valve casing divided into high and low pressure chambers, a valve controlling communication between the chambers, a valve stem attached to the valve and projecting from the casing, a pair of diaphragms one of greater area than the other and both attached to the valve stem, means for exerting a constant but adjustable pressure in one direction on the valve stem, a pair of pressure chambers, the opposed sides of the two diaphragms each forming one wall of one of the chambers, the other side of each diaphragm being exposed to atmospheric pressure, a conduit connecting the pressure chamber associated with the smaller diaphragm with the low pressure side of the reducing valve, a pair of cutoff valves, one having its inlet connected with the high pressure side and the other having its inlet connected with the low pressure side of the reducing valve, pipe connections between the outlets of the two cutoff valves and the pressure chamber associated with the larger diaphragm, a motor, gear connections whereby a predetermined rotation of the motor in one direction will open one cutoff valve and close the other, a subsequent predetermined rotation of the motor serving to close the first valve and reopen the second valve, and thermostatically controlled mechanism for determining the application of power to the motor.

16. In combination, a reducing valve comprising a valve casing divided into high and low pressure chambers, a valve controlling communication between the chambers, a valve stem attached to the valve and projecting from the casing, a pair of diaphragms one of greater area than the other and both attached to the valve stem, means for exerting a constant but adjustable pressure in one direction on the valve stem, a pair of pressure chambers, the opposed sides of the two diaphragms each forming one wall of one of the chambers, the other side of each diaphragm being exposed to atmospheric pressure, a conduit connecting the pressure chamber associated with the smaller diaphragm with the low pressure side of the reducing valve, and thermostatically controlled valved connections whereby the pressure chamber associated with the larger diaphragm may be connected with either the high or low pressure side of the reducing valve in accordance with temperature changes.

17. In combination, a reducing valve comprising a valve casing divided into high and low pressure chambers, a valve controlling communication between the chambers, a valve stem attached to the valve and projecting from the casing, a pair of diaphragms one of greater area than the other and both attached to the valve stem, means for exerting a constant but adjustable pressure in one direction on the valve stem, a pair of pressure chambers, the opposed sides of the two diaphragms each forming one wall of one of the chambers, the other side of each diaphragm being exposed to atmospheric pressure, a conduit connecting the pressure chamber associated with the smaller diaphragm with the low pressure side of the reducing valve, and thermostatically controlled valved connections whereby the pressure chamber associated with the larger diaphragm which is normally connected with the low pressure side of the reducing valve, is connected with the high pressure side when a given temperature is exceeded in the space wherein the temperature is being controlled.

18. In combination, a reducing valve comprising a valve casing divided into high and low pressure chambers, a vertically movable valve controlling communication between the chambers, a valve stem attached to the valve and projecting upwardly and downwardly therefrom, a diaphragm casing mounted above the valve casing, a diaphragm dividing this casing into upper and lower chambers, the upper chamber being open to the atmosphere, the lower portion of the chamber being extended downwardly in the form of an annular well adapted to hold a liquid, the valve stem projecting upwardly through the central opening in the well and being attached to the upper diaphragm, an inverted cup secured to the lower side of this diaphragm and projecting downwardly into the annular well, there being a conduit establishing communication between the low pressure chamber of the valve casing and the interior of the inverted cup, means for exerting a constant but adjustable vertical pressure on the valve stem, a second diaphragm casing mounted below the valve casing, a horizontal diaphragm therein dividing this casing into upper and lower chambers, the diaphragm being of greater area than the upper diaphragm and attached to the valve stem, the chamber below this diaphragm being open to the atmosphere, a pair of similar cutoff valves each having an operating crank, these valves being positioned end to end so that the cranks are brought into opposed relation and are connected so that when one valve is opened the other will be closed and vice versa, a pair of similar pipes leading down from the high and low pressure chambers of the reducing valve respectively, each pipe being connected with the inlet of one of the cutoff valves and supporting the same, a conduit leading from the outlet of each cutoff valve to the chamber above the lower diaphragm, an electric motor, gear and link connections for operating the cutoff valve cranks from the motor, a switch for cutting off power from the motor after it has rotated sufficiently in one direction to open one cutoff valve and close the other, a switch adapted to connect the power with the motor when moved in either of two directions, and a thermostat connected with the latter switch for closing the motor operating circuit at either a maximum or a minimum temperature.

CLAYTON A. DUNHAM.